March 11, 1958    J. D. KEMP    2,826,622
POLYMERIZATION PROCESS
Filed Sept. 28, 1954
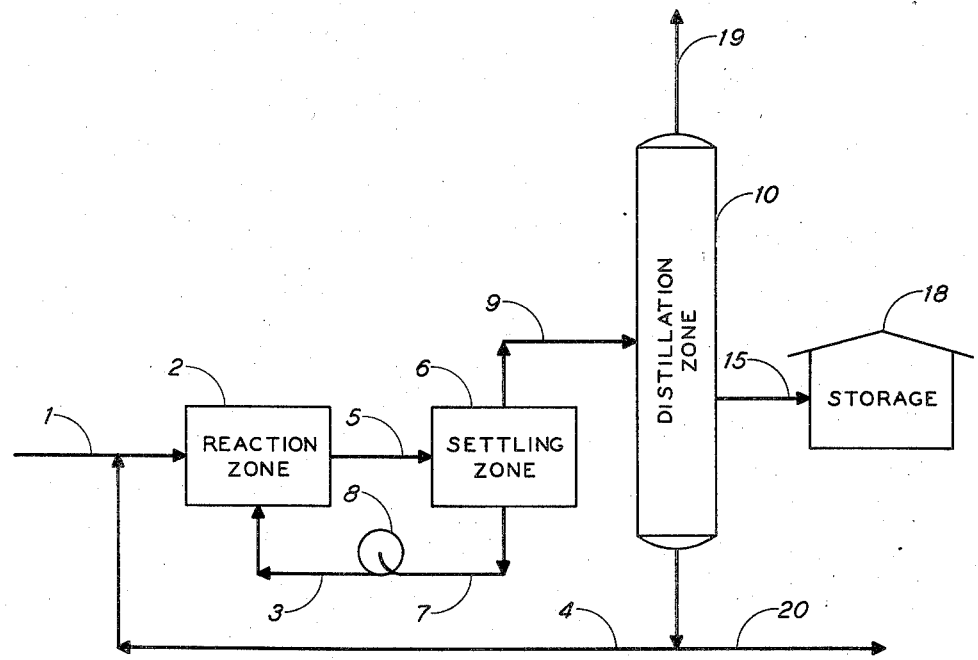
INVENTOR
JACOB D. KEMP
BY
ATTORNEY OR AGENT

United States Patent Office 2,826,622
Patented Mar. 11, 1958

2,826,622

POLYMERIZATION PROCESS

Jacob D. Kemp, El Cerrito, Calif., assignor to California Research Corporation, San Francisco, Calif., a corporation of Delaware Application September 28, 1954, Serial No. 458,809

9 Claims. (Cl. 260—183.15)

This invention relates to a method of polymerizing normally gaseous olefins in the presence of a liquid phosphoric acid catalyst. More particularly, this invention is directed to a method of this character whereby said olefins are selectively polymerized to $C_6$ polymers which are especially valuable as motor gasoline components.

It is known that normally gaseous olefins can be polymerized at elevated temperatures and pressures in the presence of a concentrated (i. e. 90–116% $H_3PO_4$) liquid phosphoric acid catalyst. For example, when propylene is so polymerized, the resulting products are predominantly heavy to very heavy polymers with little if any dimers being produced. From the standpoint of gasoline manufacturing, it is desirable to convert the olefins to lighter polymers boiling below the $C_9$ range and which consist essentially of $C_6$ hydrocarbons, this below-$C_9$ fraction being one which boils within the gasoline range and has outstanding octane-number and vapor-pressure characteristics. While propylene and other normally gaseous olefins can be polymerized to such dimers and other associated low boiling materials in the presence of relatively dilute phosphoric acids (i. e., those containing from about 40–70% $H_3PO_4$), the use of dilute acids of this character is impractical since they are highly corrosive and require the use of unduly large amounts of make-up water to maintain the desired acid concentration. It is, therefore, an object of this invention to provide a method whereby normally gaseous olefinic hydrocarbons can be selectively converted to polymers boiling in the $C_6$–$C_8$ range in the presence of a liquid phosphoric acid catalyst without experiencing the disadvantages normally associated with the use of dilute phosphoric acid catalysts.

It has now been dsicovered that normally gaseous olefins can be selectively polymerized to polymers boiling in the $C_6$–$C_8$ range by conducting the polymerization at elevated temperatures and pressures in the presence of a concentrated liquid phosphoric acid catalyst containing a minor percentage of at least one phosphate selected from the group consisting of amine salts of phosphoric acid ($H_3PO_4$), and salts of said acid with ammonia or an alkali metal.

Phosphates suitable for the practice of this invention are monoammonium phosphate, diammonium phosphate and mono-, di-, or tri-sodium, potassium, lithium, cesium or rubidium phosphate, while representative amine salts are those of phosphoric acid with such amines as methylamine, diethylamine, tributylamine, n-amylamine, n-hexylamine, aniline, and N-methylaniline, etc. These compounds can be either added as such to the liquid phosphoric acid catalyst or they can be formed in situ, e. g., by the addition of ammonia or ammonium hydroxide in the case of ammonium phosphates, an amine in the case of amine salts, or a metal or metal hydroxide in the case of alkali metal phosphates. In adding diammonium phosphate, or di- or trialkali metal phosphates to an excess of the acid, the system will come to equilibrium with the additive in the form of the more acid salt—usually the monophosphate or monoamine salt of phosphoric acid. Accordingly, in describing and claiming the invention in terms of the final, or equilibrium catalyst composition, it should be recognized that the recited phosphate catalyst components are not necessarily those which were originally added to the catalyst. Preferred catalyst additives, from the standpoint of the final catalyst composition, are monoammonium phosphate, monopotassium phosphate and monosodium phosphate.

While the amount of phosphate suitable for use in the practice of this invention may vary in minor degree, depending on the particular additive employed, it has been found that good results are obtained when the additive content is such that the atom ratio of the sum of alkali metal and nitrogen present to phosphorus has a value of between 0.005 and 0.5, and preferably is between 0.01 and 0.25. In the case of the preferred phosphates recited above, this would means that the acid catalyst solution preferably contains a total of from about 1.2 to 30% by weight of the monoammonium, sodium, and/or potassium salts.

As indicated above, the polymerization reaction is conducted at elevated temperatures and pressures in the presence of a liquid phosphoric acid catalyst having a concentration of from about 90 to 116% based upon the $H_3PO_4$ content thereof. The temperatures employed are between about 350 and 600° F., while suitable pressures are between about 50 and 2000 p. s. i. g. The olefins can be added to the catalyst body at an L. H. S. V. (i. e., liquid hourly space velocity, or volumes of liquid olefin feed per volume of catalyst per hour) of between about 0.01 and 4. While any normally gaseous olefin may be selectively polymerized to dimers and other below-$C_9$ polymers and polymer mixtures by the process of this invention, the preferred olefin feed from the standpoint of gasoline production is propylene, or a hydrocarbon stream which is rich therein.

In order that the invention may be more readily understood, reference is now made to the figure of the appended drawing which is a diagrammatic illustration of apparatus and process flow suitable for the selective polymerization of olefins to polymers boiling in the $C_6$–$C_8$ range in accordance with the practice of the present invention.

Referring to the appended drawing, a propylene-containing feed is shown as being continuously introduced through line 1 into reaction zone 2, maintained at elevated temperature and pressure, to which zone liquid phosphoric acid catalyst containing the desired amount of phosphate additive is also continuously introduced through line 3, the catalyst stream and the feed being intimately contacted in this zone in order to insure the desired conversion. This zone 2, while illustrated as a conventional reaction vessel, may be any form of apparatus affording sufficient contact time under the prevailing process conditions for the desired polymerization to take place, and it may be, for example, a conventional vessel, a centrifugal pump, a section of pipe, etc., or a combination thereof. The temperature in zone 2 may be maintained within the desired limits by use of conventional heat exchange equipment (not shown) and/or by regulating the rate at which a hydrocarbon recycle stream in line 4 is introduced.

The product stream, including the catalyst, is continuously withdrawn from zone 2 through line 5 and is discharged into settling zone 6 wherein the respective hydrocarbon and acid components of said stream separate into upper and lower layers, respectively. The catalyst phase containing the phosphate additive is withdrawn through line 7 and recycled via pump 8 and line 3 to zone 2, while the hydrocarbon phase is withdrawn through line 9 and is introduced into distillation zone 10 from which polymers boiling in the $C_6$–$C_8$ range are withdrawn through line 15 to storage tank 18. The gaseous and similar products boiling below said range are taken overhead through line 19, while a bottoms fraction is withdrawn through line 4. This latter fraction may, if desired, be recycled to zone 2 primarily for the purpose of temperature control in said zone, or the bottoms can be withdrawn from the system through line 20.

The following examples are presented to demonstrate the process of the present invention.

*Example I*

In this example, a propylene feed stream was added to 100% liquid phosphoric acid catalyst at a rate equivalent to 0.53 liquid volume of propylene per volume of catalyst per hour. The acid catalyst contained 23.9% by weight of monoammonium phosphate added in the form of diammonium phosphate. The average reaction temperature was about 500° F. and the average reaction pressure was 345 p. s. i. g. Inspections of the reaction products indicated that 67.4% of the propylene had been reacted and that 40% of the reacted propylene had been converted to propylene dimer and other polymers boiling below the $C_9$ range. When the same operation is conducted, but without the addition of the phosphate, the conversion to $C_6$–$C_8$ polymers is less than 10%.

*Example II*

In this operation, the process of Example I is repeated except that here 19% by weight of the methylamine salt of $H_3PO_4$ is substituted for the ammonium phosphate. In this case the conversion is again approximately 68%, while the amount of material boiling in the $C_6$–$C_8$ range is about 36.1%.

*Example III*

In this case the example of Example I is again repeated, with 5% by weight of monosodium phosphate being employed instead of the ammonium phosphate. In this case, the total conversion of propylene is 95%, of which approximately 20% is made up of lighter polymer products boiling in the $C_6$–$C_8$ range. When 18% by weight of monopotassium phosphate is substituted for the sodium salt, the conversion of propylene is reduced to about 65%, while the proportion of $C_6$–$C_8$ polymer in the said converted portion is increased to 35.4%.

I claim:

1. In a process for polymerizing normally gaseous olefins to polymers boiling in the $C_6$–$C_8$ range, the steps comprising contacting said olefins, at a temperature between 350 to 600° F. and a pressure of from 50 to 2000 p. s. i. g., with liquid phosphoric acid having a concentration of from about 90 to 116%, based upon the $H_3PO_4$ content thereof, and containing at least one phosphate selected from the group consisting of ammonium phosphates, amine salts of phosphoric acid and alkali metal salts of phosphoric acid, the content of said phosphate in the catalyst being such that the atom ratio of the sum of alkali metal and nitrogen present to phosphorus has a value between about 0.01 and 0.25, separating the resulting reaction mixture into a hydrocarbon phase and a catalyst phase containing said phosphate, and recovering from said hydrocarbon phase those fractions containing the desired $C_6$–$C_8$ polymers.

2. The process of claim 1 wherein the phosphate is monoammonium phosphate.

3. The process of claim 1 wherein the phosphate is monosodium phosphate.

4. The process of claim 1 wherein the phosphate is monopotassium phosphate.

5. In a process for polymerizing propylene to polymers boiling in the $C_6$–$C_8$ range, the steps comprising contacting said propylene, at a temperature between 350 to 600° F. and a pressure of from 500 to 2000 p. s. i. g., with liquid phosphoric acid having a concentration of from about 90 to 116%, based upon the $H_3PO_4$ content thereof, and containing at least one phosphate selected from the group consisting of ammonium phosphates, amine salts of phosphoric acid and alkali metal salts of phosphoric acid, the content of said phosphate in the catalyst being such that the atom ratio of the sum of alkali metal and nitrogen present to phosphorus has a value between about 0.01 and 0.25, separating the resulting reaction mixture into a hydrocarbon phase and a catalyst phase containing said phosphate, and recovering from said hydrocarbon phase those fractions containing the desired $C_6$–$C_8$ polymers.

6. The process of claim 5 wherein the phosphate is monoammonium phosphate.

7. The process of claim 5 wherein the phosphate is monosodium phosphate.

8. The process of claim 5 wherein the phosphate is monopotassium phosphate.

9. In a process for polymerizing normally gaseous olefins to polymers boiling in the $C_6$–$C_8$ range, the steps comprising contacting said olefins, at a temperature between 350 to 600° F. and a pressure of from 50 to 2000 p. s. i. g., with liquid phosphoric acid having a concentration of from about 90 to 116%, based upon the $H_3PO_4$ content thereof, and containing at least one phosphate selected from the group consisting of ammonium phosphates, amine salts of phosphoric acid and alkali metal salts of phosphoric acid, the content of said phosphate in the catalyst being such that the atom ratio of the sum of alkali metal and nitrogen present to phosphorus has a value between about 0.005 and 0.5, separating the resulting reaction mixture into a hydrocarbon phase and a catalyst phase containing said phosphate, and recovering from said hydrocarbon phase those fractions containing the desired $C_6$–$C_8$ polymers.

References Cited in the file of this patent

UNITED STATES PATENTS

| | | |
|---|---|---|
| 2,060,871 | Ipatieff | Nov. 17, 1936 |
| 2,216,549 | Deanesly | Oct. 1, 1940 |
| 2,300,123 | Keunecke et al. | Oct. 27, 1942 |
| 2,537,282 | Schaad | Jan. 9, 1951 |
| 2,592,428 | Kemp et al. | Apr. 8, 1952 |
| 2,620,361 | Karchmer | Dec. 2, 1952 |